United States Patent Office 3,475,241

Patented Oct. 28, 1969

3,475,241

PROCESS OF MAKING ALUMINUM PRINTING PLATES

Walter G. Zelley, Lower Burrell, Pa., assignor to Aluminum Company of America, Pittsburgh, Pa., a corporation of Pennsylvania No Drawing. Filed Feb. 8, 1966, Ser. No. 525,858
Int. Cl. C23f *1/00;* B41c *1/00*
U.S. Cl. 156—14 5 Claims

ABSTRACT OF THE DISCLOSURE

Limiting lateral etching of an object of aluminum having a surface portion masked with a resist coating by rapidly impinging upon the surface an etching solution kept at a temperature of at least 150° F., the solution being made up of 25–50 grams per liter alkali metal fluoride, 5–12 grams per liter alkali metal hydroxide, a sufficient amount of dissolved alumina provided by a soluble salt of aluminum and neutralizing compound active therewith to saturate the solution, and water.

This invention relates to a method of etching aluminum. More particularly the invention is directed to an improved etching process suitable for chemical engraving of aluminum as in the production of a photoengraved aluminum printing plate.

In the conventional method of making a photoengraved plate it is customary to apply a light sensitive coating to a clean, flat or cylindrical plate of an acid soluble metal. After coating, the surface is exposed to light through a negative having an image thereon so as to produce a positive image on the coating. Next the exposed surface is developed, forming an acid-resistant coating in the form of the image produced by the exposure. The acid-resistant coating is generally further hardened by heating and the final acid-resistant image is called the "resist." The image-bearing surface of the plate is then subjected to etching by an acid to produce the image in relief. A common method employed in the art is to etch the image-bearing surface of a zinc plate in a powderless etching bath comprising an acid, a filming agent, and a water-immiscible organic fluid.

Inasmuch as aluminum is a lightweight, dimensionally stable, and relatively inexpensive metal, many attempts have been made to etch or chemically engrave aluminum. However, in carrying out an etching process such as one producing an aluminum printing plate techniques must be found to reduce lateral etching; i.e., reduce etching of the relief sidewalls, causing a weakening, distortion, or complete loss of the relief image. In the use of the nitric acid etching baths commonly employed for zinc plate, this is accomplished by including in said etching baths insoluble organic agents which produce a removable acid-resistant film on the metal which exerts a controlling effect on the dissolving action of the the acid. However, aluminum is not etched by nitric acid and therefore cannot be etched by this method.

It is the principal object of the present invention to provide a new and improved method of etching aluminum.

Another object of the invention is to provide a new and improved method for producing a photoengraved aluminum plate, particularly a method in which the plate is etched with an alkaline solution.

Still another object of the invention is to provide a method of etching aluminum with an alkaline solution which effectively prevents "undercutting" of the resist and permits "deep" etching.

Other objects and advantages of the invention will become apparent to those skilled in the art from the following detailed description of the invention.

In general, the present invention concerns etching an object of aluminum having a surface portion thereof masked with a resist coating by repeatedly impinging upon the surface of the object so as to contact both the masked and unmasked portions thereof, an aqueous alkaline solution maintained at a temperature of at least 150° F. and consisting essentially of an alkali metal fluoride and an alkali metal hydroxide and dissolved alumina in an amount sufficient to saturate the solution. In a preferred embodiment of the invention the etching solution is maintained at a temperature of at least 150° F. and is comprised of 25 to 50 grams per liter of an alkali metal fluoride and 5 to 12 grams per liter of an alkali metal hydroxide in water, and dissolved alumina in an amount sufficient to saturate the solution provided by a soluble salt of aluminum and a neutralizing compound reacted with said aluminum salt.

The invention will be particularly described in conjunction with the production of photoengraved printing plates made of aluminum, although it will be quite evident to those skilled in the art that the invention may be used for other aluminum products required to be etched. The invention is applicable to aluminum materials whether the aluminum surface be of pure aluminum, a commercial grade thereof or an alloy consisting predominantly of aluminum, all of which are embraced by the term "aluminum" as generally used herein.

The plate may be prepared, generally speaking, in the usual manner conventional in the preparation of plates for etching. While a particular preparation of the plate suitable for alkaline etching is described it will be obvious to those skilled in the art that any commonly known method of preparation which results in an object of aluminum having a surface portion thereof masked with a resist coating suitable for use in an alkaline etching solution may be employed.

Conveniently the aluminum plate is prepared for a resist coating by providing the aluminum surface with a thin chromate conversion coating such as that described in U.S. Patent Nos. 2,796,370 and 2,796,371. This coating serves to bind the subsequently applied resist to the surface of the aluminum object. In preparing photoengraving plates, a photosensitive resist is applied to the plate. Any photosensitive resist capable of withstanding a hot alkaline solution may be employed, such as Eastman Kodak Company's KMER resist. The resist can be applied by whirling, spraying, flow coating, or by any other suitable method. Then the plate is air dryed and oven cured. Next the resist coated plate is exposed through a negative, and developed permitting the removal of the areas which have not been hardened by the light. In the practice of the invention it is desirable, although often not necessary, to employ next a short time caustic etch to clean the areas of the surface not protected by the developed resist.

The plate protected with the exposed and developed resist coating in the image area as just described is thus made ready for etching by the process described below.

If desired, a plate may be prepared with a metallic coating such as electrodeposited copper or nickel as the resist. In this case the metallic coating is electroplated on the aluminum plate and a conventional resist for acid etching is applied. After exposure and development in the usual way, the metallic coating is dissolved from the non-image areas with nitric acid. The plate is then ready for alkaline etching with the electrodeposited metallic coating serving as a resist protecting the image.

The alkaline solution maintained at a temperature of at least 150° F. comprising an alkali metal fluoride, an alkali metal hydroxide, dissolved alumina in an amount sufficient to saturate the solution, and water is repeatedly impinged upon the surface of the aluminum plate so as to contact both the masked and unmasked portions thereof. The etching of the aluminum object proceeds in depth, while the dissolving action laterally, that is in a direction which tends to dissolve away the metal in relief or to undercut the resist, is substantially reduced and a high "etch factor" is obtained. The term "etch factor" is defined as the ratio of the depth of the etch adjacent to a line of resist to one-half the loss in width of metal at the top of the surface of the relief beneath the line of resist.

It is desirable to produce a condition of saturation of dissolved alumina in the etching solution at the time of preparation of the solution. While a condition of saturation of dissolved alumina may be accomplished by dissolving aluminum in the etching solution such as scrap aluminum, this is time consuming and requires regulation of the hydroxide. A preferred method of producing the condition is to react a sufficient amount of a soluble salt of aluminum and of a neutralizing compound reactive with said aluminum salt to produce a condition of saturation of dissolved alumina in said solution. For example, when 25 to 50 grams per liter of a soluble alkali metal aluminate is reated in an aqueous solution with 25 to 50 grams per liter of an alkali metal bicarbonate, a condition of saturation of dissolved alumina is produced. Alternatively, the condition may be produced when 140 to 180 grams per liter of aluminum sulfate is reacted with 49 to 63 grams per liter of alkali metal hydroxide. These examples represent only preferred modes of producing a condition of saturation of dissolved alumina in the solution prior to etching, and it is understood that the invention is not limited thereby.

Preferably about 25 to 50 grams per liter of alkali metal fluoride, and 5 to 12 grams per liter of alkali metal hydroxide are prepared in an aqueous solution, saturated with dissolved alumina as described above. The resulting solution is maintained at a temperature of at least 150° F. and is repeatedly impinged upon the surface of the plate as described above.

It appears that some film forming reaction takes place on the unmasked portion of the plate, one that permits penetration to the aluminum at the point of direct impingement of the solution but limits lateral etching. As etching proceeds the sidewalls of the relief image are not substantially attacked; however, the etching solution repeatedly impinging onto the plate permits etching to continue in depth.

The etching solution may be repeatedly impinged upon the plate or other object to be etched by any of the methods known in the art such as air atomization, wherein the etching solution is repeatedly impinged upon the object to be etched through an atomizing nozzle. Another commonly employed method is the splash method, wherein a series of paddles beat the surface of the bath and this causes the etching solution to be repeatedly impinged upon the object to be etched as it is held above the bath in a position to receive the splash. The alkaline bath mixture after being splashed against the object to be etched drops back into the bath or against the paddles and is thus repeatedly impinged upon the object to be etched.

The following specific examples are further illustrative of the invention.

Example 1

A 7" x 27" x 0.025" plate cut from a sheet of 1100 aluminum alloy was cleaned and coated with a thin chromate conversion coating, and a photosensitive KMER resist coating was applied and cured. The resist coated plate was then exposed through a negative and developed to remove the areas which had not been hardened by the light. The plate was mounted in a paddle type splash etcher above the etching bath. The etching solution was prepared by reacting sodium bicarbonate with sodium aluminate in water (to saturate the solution with alumina) and then sodium fluoride and sodium hydroxide were added, according to the formulation:

40 grams per liter sodium aluminate,
40 grams per liter sodium bicarbonate,
40 grams per liter sodium fluoride,
8 grams per liter sodium hydroxide.

The solution was heated to a temperature of 165° F. and repeatedly impinged upon the plate until the desired etching depth was obtained. The plate in this example was etched to a depth of 10 mils in 45 minutes and exhibited an etch factor of 20:1.

Example 2

For etching a plate similar to that of Example 1, an etching solution was prepared by reacting aluminum sulfate with sodium hydroxide in water, and then adding sodium fluoride, according to the formulation:

160 grams per liter aluminum sulfate,
65 grams per liter sodium hydroxide (of which 56 grams per liter react with the aluminum sulfate to saturate the solution with alumina),
40 grams per liter sodium fluoride.

The solution was heated to a temperature of 165° F. and repeatedly impinged upon the plate until the desired etching depth was obtained. The plate in this example was etched to a depth of 7 mils in 45 minutes and exhibited an etch factor of 14:1.

When the same etching solution is to be used over an extended period of time, it is desirable but not necessary to add approximately 5 grams per liter of sodium gluconate or some other suitable sequestering agent to the etching solution.

It also may be noted that the etched aluminum plate finally produced may be further treated for the purpose of increasing its wear resistance, if desired. For example, a suitable wear resistance may be obtained either by anodizing the etched aluminum plate by any of the established anodizing techniques or by chromium plating the etched aluminum plate, or by any other method known in the art to increase the wear resistance of the finally etched aluminum plate.

I claim as my invention:

1. The method of etching an object of aluminum having a surface portion thereof masked with a resist coating which comprises:
repeatedly impinging upon the surface of the object so as to contact both the masked and unmasked portions thereof, a solution maintained at a temperature of at least 150° F. and consisting essentially of
25 to 50 grams per liter of alkali metal fluoride
5 to 12 grams per liter of alkali metal hydroxide
dissolved alumina in an amount sufficient to saturate the solution and
water,
whereby penetration of the solution to the aluminum at the point of direct impingement of the solution and etching thereby in depth is permitted but lateral etching is limited.

2. A method of etching an object of aluminum according to claim 1 wherein the fluoride content and hydroxide content of the solution consists essentially of
25 to 50 grams per liter of sodium fluoride and
5 to 12 grams per liter of sodium hydroxide.

3. The method of etching an object of aluminum having a surface portion thereof masked with a resist coating which comprises:
repeatedly impinging upon the surface of the object so as to contact both the masked and unmasked portions thereof a solution maintained at a temperature of at least 150° F. and consisting essentially of:
25 to 50 grams per liter of alkali metal fluoride,
5 to 12 grams per liter of alkali metal hydroxide
dissolved alumina in an amount sufficient to saturate the solution provided by a soluble salt of aluminum and a neutralizing compound reacted with said aluminum salt, and water, whereby penetration of the solution to the aluminum at the point of direct impingement of the solution and etching thereby in depth is permitted but lateral etching is limited.

4. A method of etching an object of aluminum according to claim 3 wherein the dissolved alumina content of the solution is provided by:

25 to 50 grams per liter of alkali metal aluminate as the soluble aluminum salt, and 25 to 50 grams per liter of an alkali metal bicarbonate as the neutralizing compound reacted with said aluminum salt.

5. A method of etching an object of aluminum according to claim 3 wherein the dissolved alumina content of the solution is provided by:

140 to 180 grams per liter of aluminum sulfate as the soluble aluminum salt, and 49 to 63 grams per liter of additional alkali metal hydroxide as the neutralizing compound reached with said aluminum salt.

References Cited

UNITED STATES PATENTS

| | | | |
|---|---|---|---|
| 2,811,426 | 10/1957 | Mason | 156—23 |
| 3,356,550 | 12/1967 | Stiffler et al. | 156—22 |

JACOB H. STEINBERG, Primary Examiner

U.S. Cl. X.R.

156—22; 252—79.3, 79.5